US006488456B1

(12) United States Patent
Satran et al.

(10) Patent No.: US 6,488,456 B1
(45) Date of Patent: Dec. 3, 2002

(54) SLOTTING CUTTER

(75) Inventors: Amir Satran, Kfar Vradim (IL); Yaron Eisen, Kfar Vradim (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 09/458,673

(22) Filed: Dec. 10, 1999

(30) Foreign Application Priority Data

Dec. 29, 1998 (IL) .................................. 127827

(51) Int. Cl.$^7$ .............................. B23C 5/26; B23C 5/20
(52) U.S. Cl. .......................... 409/234; 407/40; 407/46; 407/52; 403/273; 29/447; 83/838; 83/840; 83/698.41
(58) Field of Search ................................ 407/46, 34, 12, 407/40, 48, 51, 52, 64, 20–29; 409/234; 279/143, 144, 145, 83, 85, 76, 97; 403/28, 362, 273; 83/838–840, 698.41, 835, 666, 665; 29/447

(56) References Cited

U.S. PATENT DOCUMENTS

| 151,043 A | * | 5/1874 | Miller | 83/839 |
|---|---|---|---|---|
| 182,178 A | * | 9/1876 | Disston | 83/838 |
| 220,008 A | * | 9/1879 | Weaver | 83/838 |
| 411,189 A | * | 9/1889 | Grey | 83/838 |
| 1,357,030 A | * | 10/1920 | Currier | 83/838 |
| 1,762,111 A | * | 6/1930 | Weddell | 407/42 |
| 2,033,384 A | * | 3/1936 | Marshall | 407/22 |
| 2,431,581 A | * | 11/1947 | Owen et al. | 407/34 |
| 2,598,649 A | * | 5/1952 | Rintoul | 83/698.41 |
| 2,600,272 A | * | 6/1952 | Segal | 83/852 |
| 2,828,672 A | * | 4/1958 | McMullen | 407/25 |
| 2,989,800 A | * | 6/1961 | Comly | 407/40 |
| 3,176,732 A | * | 4/1965 | Henderson | 83/852 |
| 3,309,756 A | * | 3/1967 | Segal | 83/851 |
| 3,729,808 A | * | 5/1973 | Wolf et al. | 407/51 |
| 3,757,397 A | * | 9/1973 | Lindsay | 407/46 |
| 4,061,076 A | | 12/1977 | Robertson | |
| 4,204,787 A | | 5/1980 | McCray et al. | |
| 4,330,227 A | * | 5/1982 | Raye et al. | 407/46 |
| 4,456,408 A | * | 6/1984 | Glasow | 407/46 |
| 4,522,538 A | | 6/1985 | Lindsay | |
| 4,662,259 A | * | 5/1987 | Dutina | 83/838 |
| 4,692,069 A | * | 9/1987 | Kieninger | 407/46 |
| 4,995,767 A | * | 2/1991 | Segal | 407/34 |
| 5,163,788 A | * | 11/1992 | Dahl et al. | 407/46 |
| 5,197,231 A | * | 3/1993 | Pedersen et al. | 451/540 |
| 5,582,494 A | | 12/1996 | Cook | |
| 5,662,436 A | * | 9/1997 | Bishop | 407/48 |
| 5,711,642 A | * | 1/1998 | Ball et al. | 409/234 |
| 5,788,426 A | * | 8/1998 | Daniels | 407/46 |
| 5,848,858 A | * | 12/1998 | Jager et al. | 407/34 |
| 5,979,912 A | | 11/1999 | Cook | |
| 6,012,372 A | * | 1/2000 | Laster et al. | 83/698.61 |

FOREIGN PATENT DOCUMENTS

| CA | 001015246 A | * | 8/1977 | 83/698.41 |
|---|---|---|---|---|
| DE | 880838 | * | 6/1953 | 407/40 |
| FR | 2443308 A1 | * | 8/1980 | |

OTHER PUBLICATIONS

Eastman, M., "Shrink–Fit Toolholding", Cutting Tool Engineering Magazine, Apr. 1997, vol. 49, No. 3.*
American Machinists' Handbook, Seventh Ed., New York, 1940, pp. 738–739, 780–781, 390–391, 1292–1293.*
The Shop Tool Manual, Brown & Sharp, 1960, pp. 136–137.*

* cited by examiner

Primary Examiner—A. L. Wellington
Assistant Examiner—Erica E Cadugan
(74) Attorney, Agent, or Firm—Pennie & Edmonds LLP

(57) ABSTRACT

A slotting cutter and a method for constructing the slotting cutter. The slotting cutter is structurally divided into two portions, a central adapter portion and a cutter portion. The central adapter portion is a disk with an F-type or S-type adapter. The cutter portion is an annular ring provided with cutting insert receiving pockets, or cartridge receiving pockets. The cutter portion and a body portion are manufactured separately and combined to form the slotting cutter by a heat shrinkage method.

22 Claims, 6 Drawing Sheets

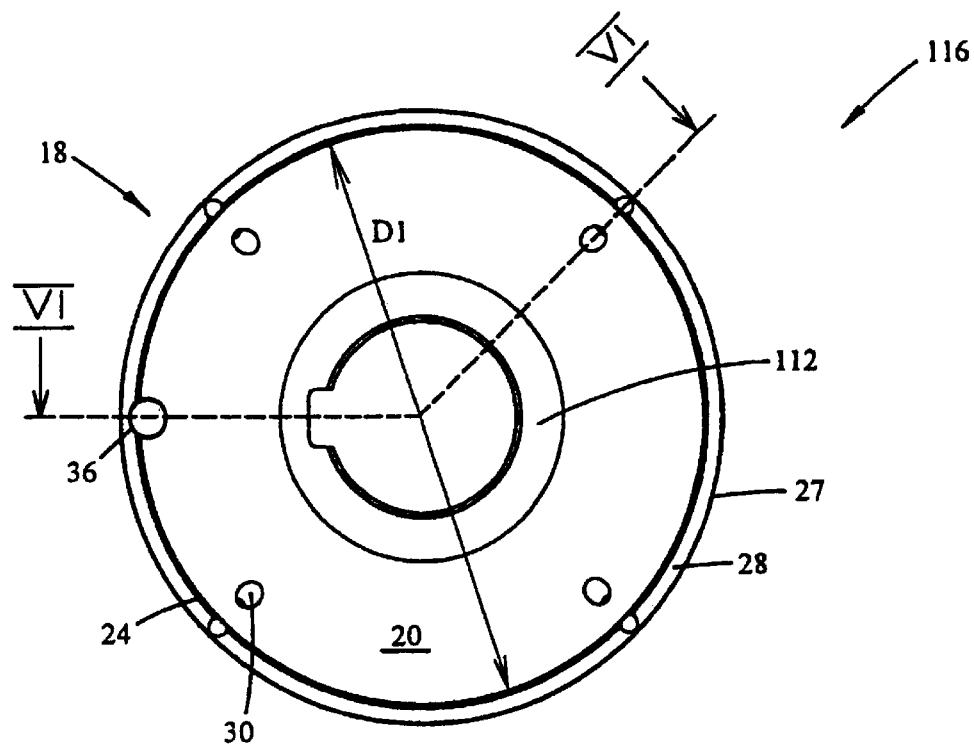
Fig. 5
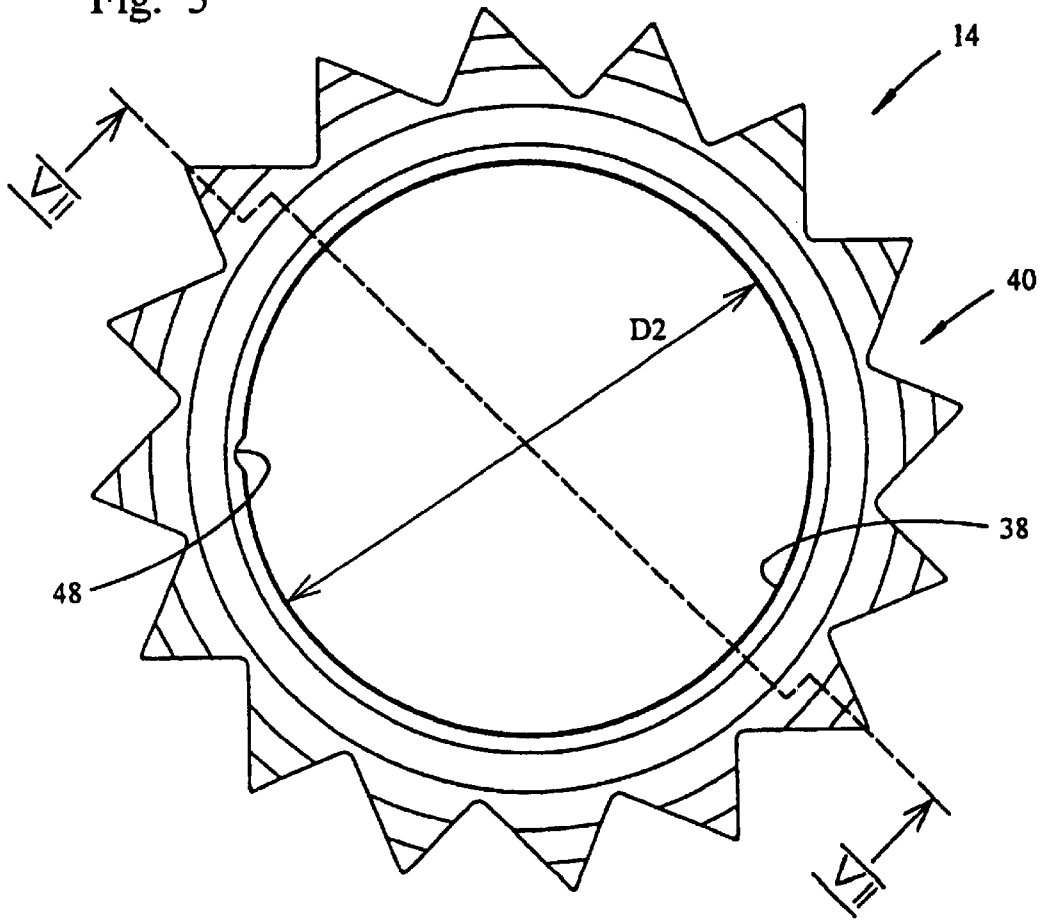

SLOTTING CUTTER

FIELD OF THE INVENTION

The present invention relates to slotting cutters and a method for constructing such slotting cutters.

BACKGROUND OF THE INVENTION

Slotting cutters can be left handed, right handed or neutral, depending on the location of cutting inserts on the slotting cutter's outer periphery. In addition they generally come with two different types of adapter, referred to herein both in the specification and claims as "S-type" and "F-type" adapters. An "S-type" adapter is a central opening centered at the slotting cutter's axis of rotation, designed to receive an arbor connected to a spindle. An "F-type" adapter is a generally cylindrical central protrusion at the slotting cutter's central opening constituting an arbor for connecting to a spindle.

A major problem in the cutting tool industry is that of supply time. Typically, the conventional supply time for a slotting cutter, from the time of order, is four to eight weeks. An obvious way of reducing supply time to an absolute minimum would be to manufacture all the various types of slotting cutters and store them. As soon as an order is placed by a client for a given number of slotting cutters, they are retrieved from storage and supplied to the client. However, taking into account the many types of slotting cutters that would have to be produced and stored (left handed, right handed and neutral, with either "S-type" or "F-type" adapters), such a simplistic approach has a disadvantage that it would place heavy demands both on storage space and financial investment.

It is an object of the present invention to provide slotting cutters and a method for producing such slotting cutters in which the supply time is considerably less than the conventional supply time and in which the aforementioned disadvantage is reduced.

SUMMARY OF THE INVENTION

Slotting cutters in accordance with the present invention are structurally divided into two portions, a central adapter portion and a cutter portion. The central adapter portion comprises a disk with an F-type or S-type adapter. The cutter portion is an annular ring provided with cutting insert receiving pockets, or cartridge receiving pockets.

Thus in accordance with the present invention there is provided a slotting cutter comprising a cutter portion affixed to a body portion;

the body portion comprising a disk having an outer peripheral surface with a first diameter and a central portion provided with an adapter;

the cutter portion comprising an annular ring having an inner surface with a second diameter and an outer portion provided with recesses;

the cutter portion being formed of a material having thermal characteristics such that the application of heat thereto causes thermal expansion thereof, thus allowing the support member of the body portion to be positioned inside the cutter portion, and cooling thereof causes thermal contraction thereof, whereby the cutter portion is rigidly affixed to the body portion.

Further in accordance with the present invention there is provided method for constructing a slotting cutter comprising the steps of:

providing a body portion comprising a disk having an outer peripheral surface with a first diameter and a central portion provided with an adapter;

providing a cutter portion comprising an annular ring having an inner surface with a second diameter and an outer portion provided with recesses, the cutter portion being formed of a material having thermal characteristics such that the application of heat thereto causes thermal expansion thereof; and affixing the cutter portion to the central body portion by:
applying heat to the to the cutter portion;
positioning the body portion inside the heated cutter portion; and
allowing the cutter portion to cool, thereby causing thermal contraction thereof, whereby the cutter portion becomes rigidly affixed to the body portion.

Typically, the first diameter is larger than the second diameter.

Preferably, the slotting cutter is provided with an axial securing arrangement for ensuring that the cutter portion is secured against axial movement relative to the body portion.

In accordance with a preferred embodiment of the present invention, the axial securing arrangement comprises at least two countersunk through bores extending from the front face of the support member to the outer peripheral surface thereof that mate, when the body portion is positioned inside the heated cutter portion, with at least two depressions provided on the inner surface of the cutter portion and countersunk head screws screwed into the at least two countersunk through bores and engaging a rear section of the at least two depressions Typically, each countersunk through bore has a longitudinal axis that makes an acute angle $\alpha$ with a normal to the front face of the support member.

Preferably, the slotting cutter is provided with a rotational securing arrangement for ensuring that the cutter portion is secured against rotational movement relative to the body portion.

In accordance with a preferred embodiment of the present invention, the rotational securing arrangement comprises a protrusion protruding from the outer peripheral surface of the support member, which protrusion engaging an indent on the inner surface of the cutter portion.

If desired, the recesses are insert receiving pockets.

In accordance with a preferred embodiment of the present invention, the recesses are cartridge receiving pockets for receiving cutting insert receiving cartridges.

If desired, the slotting cutter is provided with right-hand cutting insert receiving cartridges.

Further if desired, the slotting cutter is provided with left-hand cutting insert receiving cartridges.

Yet further if desired, the slotting cutter is provided with both left-handed and right-hand cutting insert receiving cartridges.

In accordance with one embodiment, the adapter of the slotting cutter is an S-Type adapter.

In accordance with another embodiment, the adapter of the slotting cutter is an F-Type adapter.

BRIEF DESCRIPTION OF THE DRAWINGS

For a better understanding the invention will now be described, by way of example only, with reference to the accompanying drawings in which:

FIG. 5 is a side exploded view of a slotting cutter with an S-type adapter;

DETAILED DESCRIPTION OF THE INVENTION

Figure 1:
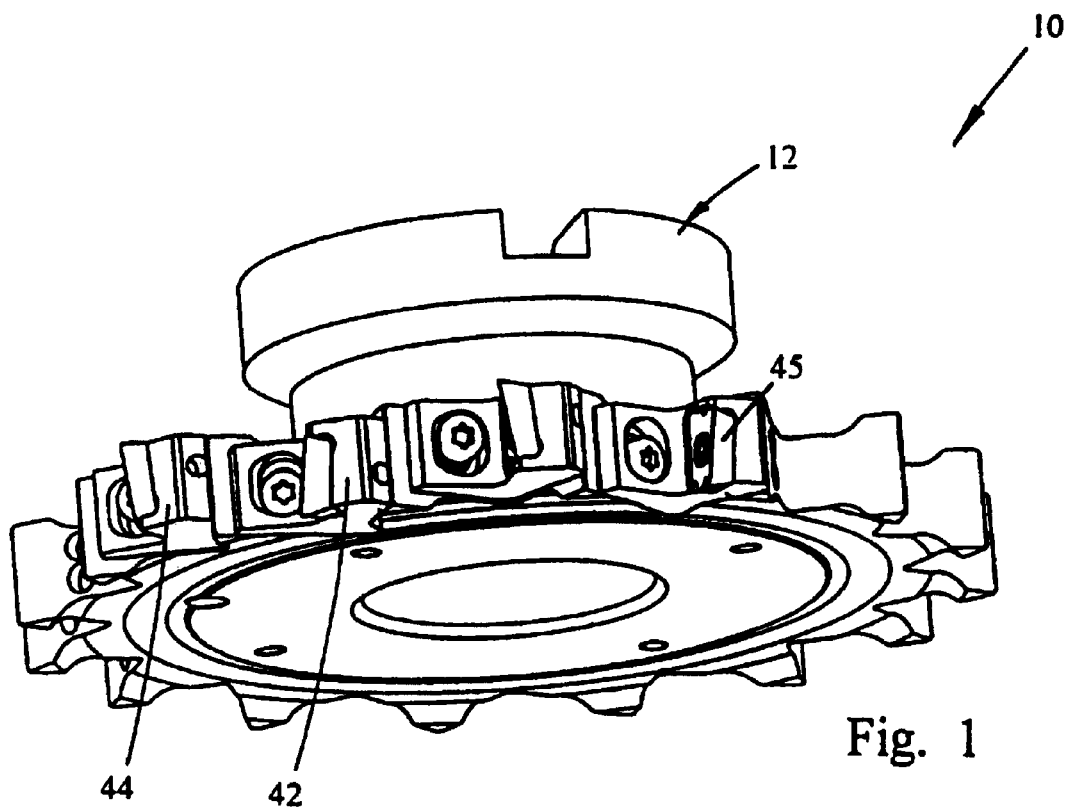
FIG. 1 is a perspective view of a slotting cutter with an F-type adapter.
Figure 2:
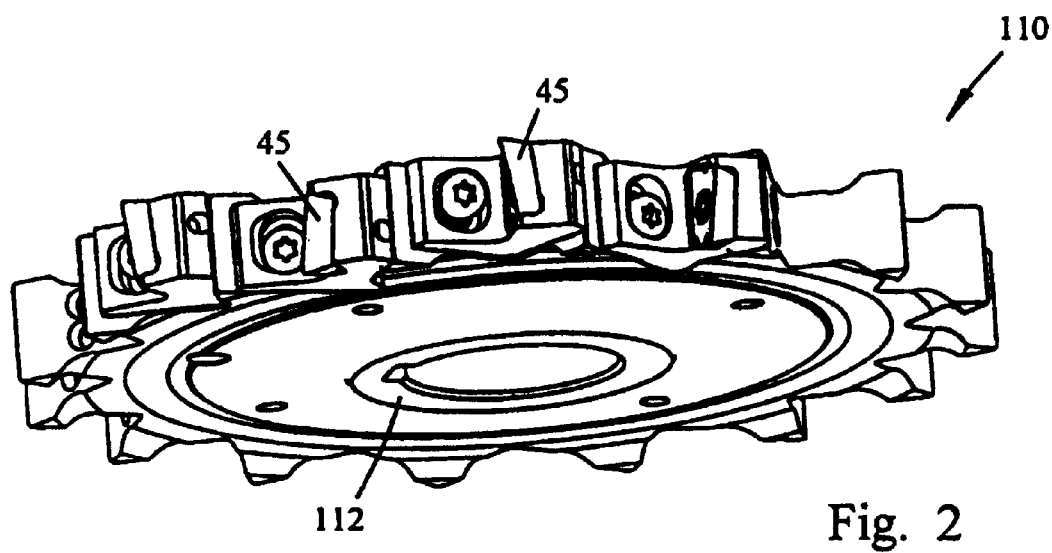
FIG. 2 is a perspective view of a slotting cutter with an S-type adapter.
Figure 3:
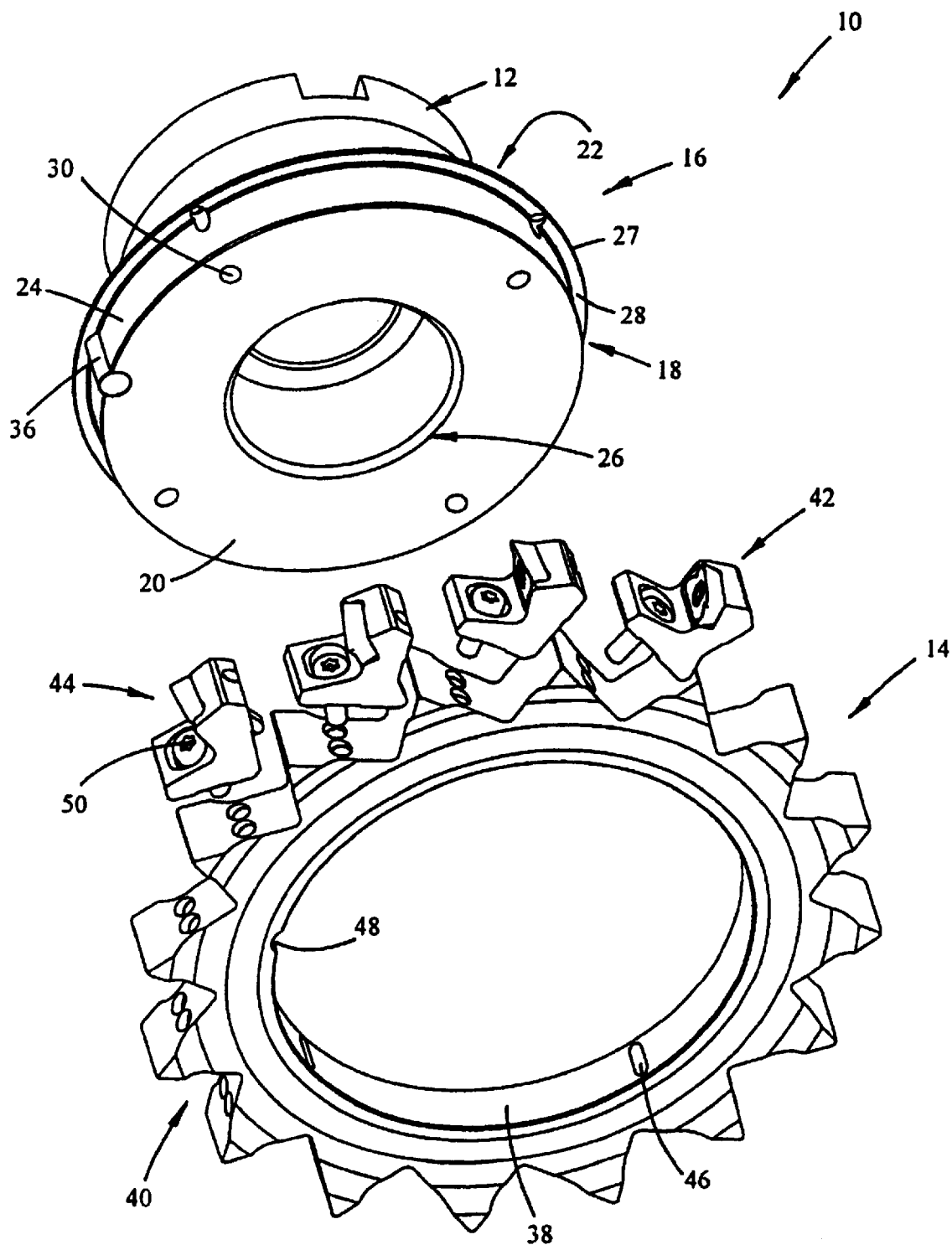
FIG. 3 is a perspective exploded view of a slotting cutter with an F-type adapter.
Figure 4:
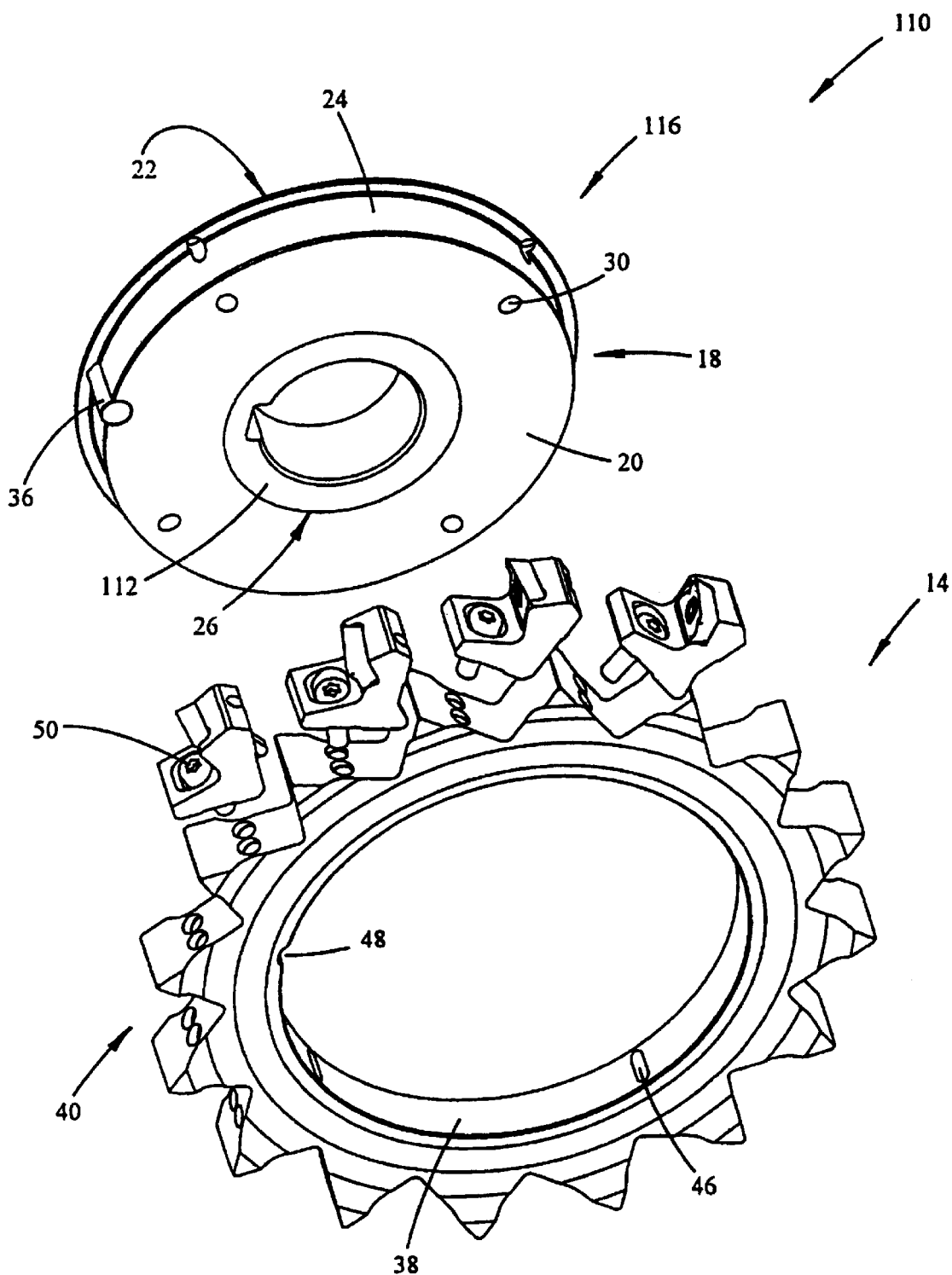
FIG. 4 is a perspective exploded view of a slotting cutter with an S-type adapter.

Attention is drawn to the drawings, showing two basic types of slotting cutters, 10 and 12, that are differentiated by their adapters. In the following description the same reference numeral will be used to indicate identical features or elements of the two slotting cutters. Features or elements that are not identical but perform a similar function in each of the slotting cutters, will be referred to by the same name and will be designated by the reference numeral n with respect to the first type of slotting cutter and designated by the reference numeral n+100 with respect to the second type of slotting cutter.

Figure 6:
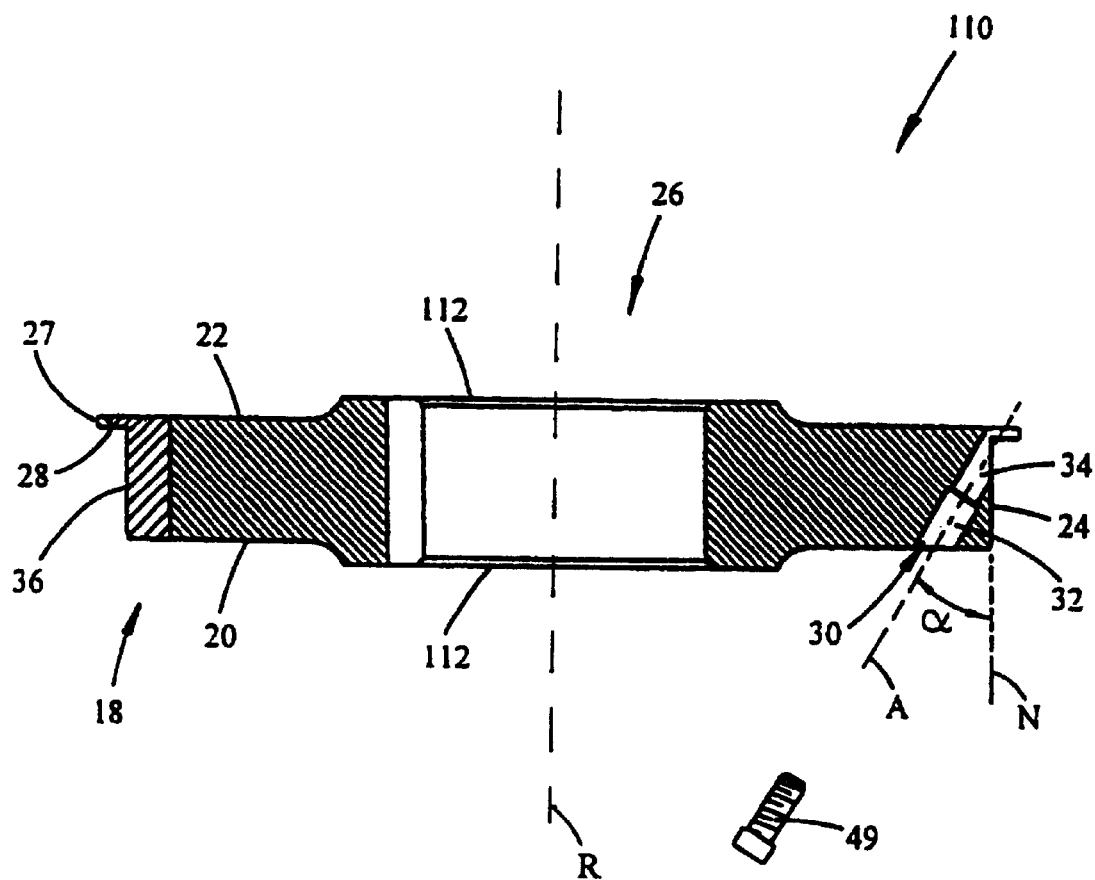
FIG. 6 is a sectional view indicated by the line VI—VI of FIG. 5.
Figure 7:
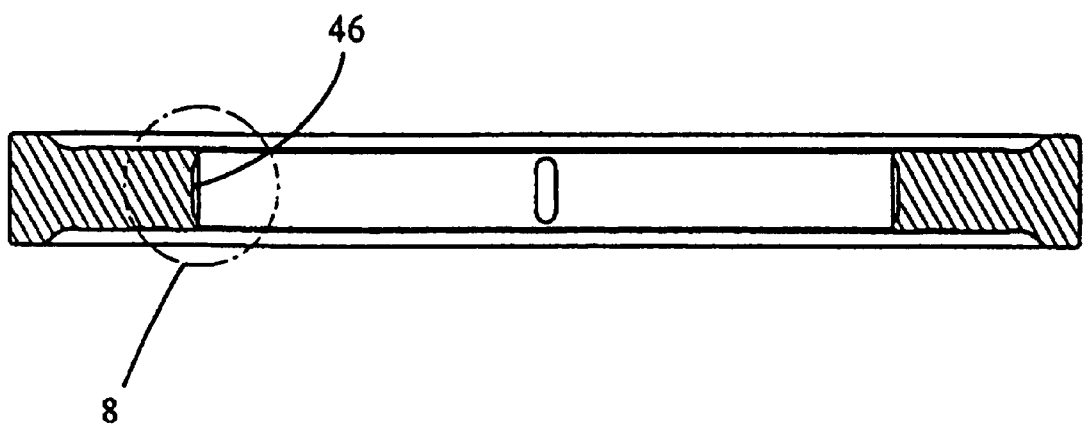
FIG. 7 is a sectional view indicated by the line VII—VII of FIG. 5.
Figure 8:
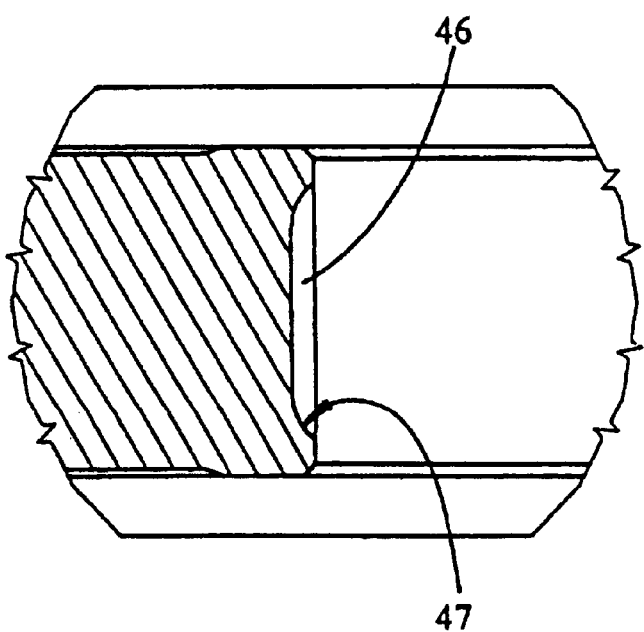
FIG. 8 is an enlarged detail of a portion of FIG. 7.

The first type of slotting cutter 10 has an F-type adapter 12 and will therefore also be referred to as an F-type slotting cutter. The second type of slotting cutter 110 has an S-type adapter 112 and will therefore also be referred to as an S-type slotting cutter. Each type of slotting cutter comprises a cutter portion 14 and a body portion 16 (116) which are manufactured separately and combined to form the slotting cutter by a heat shrinkage method, as will be described in greater detail below. The body portion 16 (116) comprises a disk-like support member 18 having front and rear faces 20 and 22, respectively, an outer peripheral surface 24 of diameter D1 and a central portion 26 provided with an adapter. The adapter 12 of the F-type slotting cutter 10 extends rearwardly from the rear of the support member 18, whereas the adapter 112 of the S-type of slotting cutter 110 is substantially of the same thickness as the support member 18, slightly protruding from the front and rear faces 20 and 22, respectively (see FIG. 6).

A thin lip 27, having a forwardly facing location surface 28, extends radially from the rear face 22 of the support member. Four countersunk through bores 30 extend from the front face 20 to the outer peripheral surface 24. In the drawings the countersunk through bores 30 are shown to continue on from the outer peripheral surface 24 to the lip 27. It should be noted that this is for convenience of production only. In principle, it is sufficient that the countersunk through bore 30 extend from the front face 20 to the outer peripheral surface 24 and at an angle oblique to a rotary axis (R) of the tool. Each countersunk through bore has a longitudinal axis A that makes an acute angle a with a normal N to the front face 20. Each countersunk through bore 30 has a forward countersunk portion 32 and a rear screw threaded portion 34. The support member 18 has a protrusion 36 protruding from the outer peripheral surface 24. The function of the countersunk through bores 30 and of the protrusion 36 will be described below with reference to an assembled slotting cutter. For convenience of production, the protrusion is manufactured by first forming a bore at the periphery of the support member and then forcibly urging a pin into the bore so that part of the pin protrudes beyond the outer peripheral surface 24.

The cutter portion 14 has the form of an annular ring having an inner surface 38 with a diameter D2 and an outer portion provided with recesses 40. The diameter D2 of the inner surface 38 of the cutter portion 14 is smaller than the diameter D1 of the outer peripheral surface 24 of the support member 18. Preferably, the recesses are cartridge receiving pockets for receiving cutting insert receiving cartridges. Either right-hand 42, left-hand 44, or both right-hand and left-hand insert receiving cartridges can be mounted in the recesses 40. However, the recesses 40 can also be designed as insert receiving pockets for directly mounting cutting inserts therein. The cutting inserts 45 can be of any desired design, with the cutting insert receiving cartridges accordingly designed.

The cutter portion 14 is provided with four depressions 46 on its inner surface 38, that are designed to mate with the four countersunk through bores 30 when assembling the slotting cutter. An indent 48 on the inner surface 38 of the cutter portion 14 is designed to mate with the protrusion 36 protruding from the outer peripheral surface 24 of the support member 18 of the body portion. The mating indent-protrusion combination provides a rotational securing arrangement that ensures that in the assembled slotting cutter the cutter portion 14 will not rotate relative to the body portion 16.

In accordance with the present invention, body portions 16 (116) and cutter portions 14 are manufactured separately and slotting cutters 10 (110) are constructed by affixing the cutter portions to the body portions using a heat shrinkage process. Heat is applied to a cutter portion 14 until its diameter D2 is greater than the diameter D1 of the support member. The support member 18 of the body portion 16 is then positioned inside the cutter portion 14, with the protrusion 36 engaging the indent 48, and urged toward the lip 27 until the cutter portion abuts the location surface 28. Clearly, the radial extension of the lip 27 has to be sufficient to ensure such abutment. The lip 27 has to be sufficiently thick so as to enable it to withstand any axial force applied to it by the cutter portion 14. As the cutter portion cools it contracts and becomes rigidly affixed to the body portion.

After assembling the slotting cutter as described above, a countersunk head screw 49 is placed in each countersunk through bore 30 and is screwingly engaged by the rear screw threaded portion 34. The countersunk head screw 49 is tightened until it engages the depression 46, on the inner surface 38 of the cutter portion 14, and abuts a rear section 47 of the depression. As the countersunk head screw is tightened it applies a force to the cutter portion 14, the axial component of which ensures that the cutter portion 14 is secured against axial movement relative to the body portion 16 in a direction away from the location surface 28. The angle $\alpha$ is preferably chosen to give rise to a maximal axial component of the force applied by the countersunk head screw.

Finally, right-hand 42 and/or left-hand 44 insert receiving cartridges are affixed, by means of screws 50, to the recesses 40 to complete the construction of the slotting cutter 10 (110).

Although the present invention has been described to a certain degree of particularity, it should be understood that various alterations and modifications can be made without departing from the spirit or scope of the invention as hereinafter claimed.

What is claimed is:

1. A slotting cutter comprising a cutter portion affixed to a body portion;

the body portion comprising a disk-like support member having an outer peripheral surface with a first diameter and a central portion provided with an adapter;

the cutter portion comprising an annular ring having an inner surface with a second diameter and an outer portion provided with recesses;

the first diameter being larger than the second diameter;

the cutter portion being formed of a material having thermal expansion and contraction characteristics such that application of heat to the cutter portion thermally increases the second diameter, thus allowing the support member of the body portion to be positioned inside the cutter portion, and cooling the cutter portion causes thermal contraction in an amount sufficient to rigidly affix the cutter portion to the body portion, wherein the slotting cutter is provided with a securing arrangement for ensuring that the cutter portion is secured against movement relative to the body portion;

the securing arrangement comprises at least two countersunk through bores extending from a front face of the support member to the outer peripheral surface of the support member that mate, when the body portion is positioned inside the cutter portion, with at least two depressions provided on the inner surface of the cutter portion and countersunk head screws screwed into the at least two countersunk through bores and engaging the at least two depressions, and each countersunk through bore has a longitudinal axis that makes an acute angle ($\alpha$) with a normal to the front face of the support member.

2. The slotting cutter in accordance with claim 1, wherein the recesses are insert receiving pockets.

3. The slotting cutter in accordance with claim 1, wherein the recesses are cartridge receiving pockets for receiving cutting insert receiving cartridges.

4. The slotting cutter in accordance with claim 1, wherein the slotting cutter is provided with right-hand cutting insert receiving cartridges.

5. The slotting cutter in accordance with claim 1, wherein the slotting cutter is provided with left-hand cutting insert receiving cartridges.

6. The slotting cutter in accordance with claim 1, wherein the slotting cutter is provided with both left-handed and right-handed cutting insert receiving cartridges.

7. The slotting cutter in accordance with claim 1, wherein the adapter of the slotting cutter is an S-Type adapter.

8. The slotting cutter in accordance with claim 1, wherein the adapter of the slotting cutter is an F-Type adapter.

9. A slotting cutter assembly comprising:

a body portion comprising a support member having an outer peripheral surface with a first diameter and a central portion provided with an adapter; and a cutter portion comprising an annular ring having an inner surface with a second diameter and an outer portion provided with recesses, the first diameter being larger than the second diameter; wherein the slotting cutter assembly is adjustable between an unassembled position in which the body portion and cutter portion are separated from each other, and an assembled position in which the outer peripheral surface of the support member of the body portion is positioned inside the inner surface of the cutter portion, the slotting cutter is provided with a securing arrangement for ensuring that the cutter portion is secured against movement relative to the body portion;

the securing arrangement comprises at least two countersunk through bores extending from a front face of the support member to the outer peripheral surface of the support member that mate, when the body portion is positioned inside the cutter portion, with at least two depressions provided on the inner surface of the cutter portion and countersunk head screws screwed into the at least two countersunk through bores and engaging the at least two depressions, and each countersunk through bore has a longitudinal axis that makes an acute angle ($\alpha$) with a normal to the front face of the support member.

10. The slotting cutter assembly in accordance with claim 9, wherein the cutter portion is formed of a material having thermal expansion and contraction characteristics such that application of heat to the cutter portion increases said second diameter of the cutter portion's inner surface to an extent sufficient to receive the outer peripheral surface of the body portion.

11. A slotting cutter comprising a cutter portion affixed to a body portion;

the body portion comprising a disk-like support member having an outer peripheral surface with a first diameter and a central portion provided with an adapter;

the cutter portion comprising an annular ring having an inner surface with a second diameter and an outer portion provided with recesses;

the first diameter being larger than the second diameter;

the cutter portion being formed of a material having thermal expansion and contraction characteristics such that application of heat to the cutter portion thermally increases the second diameter, thus allowing the support member of the body portion to be positioned inside the cutter portion, and cooling the cutter portion causes thermal contraction in an amount sufficient to rigidly affix the cutter portion to the body portion, wherein the slotting cutter is provided with a securing arrangement for ensuring that the cutter portion is secured against movement relative to the body portion;

the securing arrangement comprises at least two countersunk through bores extending from a front face of the support member to the outer peripheral surface of the support member that mate, when the body portion is positioned inside the cutter portion, with at least two depressions provided on the inner surface of the cutter portion and countersunk head screws screwed into the at least two countersunk through bores and engaging the at least two depressions, and each through bore has a longitudinal axis (A) that extends at an angle oblique to a rotary axis (R) of the body portion.

12. A slotting cutter assembly comprising:

a body portion comprising a support member having an outer peripheral surface with a first diameter and a central portion provided with an adapter; and a cutter portion comprising an annular ring having an inner surface with a second diameter and an outer portion provided with recesses, the first diameter being larger than the second diameter; wherein the slotting cutter assembly is adjustable between an unassembled position in which the body portion and cutter portion are separated from each other, and an assembled position in which the outer peripheral surface of the support member of the body portion is positioned inside the inner surface of the cutter portion, the slotting cutter is provided with a securing arrangement for ensuring that the cutter portion is secured against movement relative to the body portion;

the securing arrangement comprises at least two countersunk through bores extending from a front face of the support member to the outer peripheral surface of the support member that mate, when the body portion is positioned inside the cutter portion, with at least two depressions provided on the inner surface of the cutter portion and countersunk head screws screwed into the at least two countersunk through bores and engaging the at least two depressions, and each through bore has a longitudinal axis (A) that extends at an angle oblique to a rotary axis (R) of the body portion.

13. The slotting cutter assembly in accordance with claim 12, wherein the recesses are insert receiving pockets.

14. The slotting cutter assembly in accordance with claim 12, wherein the recesses are cartridge receiving pockets for receiving cutting insert receiving cartridges.

15. The slotting cutter assembly in accordance with claim 12, wherein the slotting cutter is provided with right-hand cutting insert receiving cartridges.

16. The slotting cutter assembly in accordance with claim 12, wherein the slotting cutter is provided with left-hand cutting insert receiving cartridges.

17. The slotting cutter assembly in accordance with claim 12, wherein the slotting cutter is provided with both left-handed and right-handed cutting insert receiving cartridges.

18. The slotting cutter assembly in accordance with claim 12, wherein the adapter of the slotting cutter is an S-Type adapter.

19. The slotting cutter assembly in accordance with claim 12, wherein the adapter of the slotting cutter is an F-Type adapter.

20. The slotting cutter assembly in accordance with claim 12, wherein the cutter portion is formed of a material having thermal expansion and contraction characteristics such that application of heat to the cutter portion increases said second diameter of the cutter portion's inner surface to an extent sufficient to receive the outer peripheral surface of the body portion.

21. A slotting cutter assembly comprising:

a body portion comprising a support member having an outer peripheral surface with a first diameter and a central portion provided with an adapter; and a cutter portion comprising an annular ring having an inner surface with a second diameter and an outer portion provided with recesses; wherein the slotting cutter assembly is adjustable between an unassembled position in which the body portion and cutter portion are separated from each other, and an assembled position in which the outer peripheral surface of the support member of the body portion is positioned inside the inner surface of the cutter portion, the slotting cutter assembly is provided with a rotational securing arrangement for ensuring that the cutter portion is secured against rotational movement relative to the body portion, when the slotting cutter assembly is in the assembled position, and the rotational securing arrangement comprises a protrusion protruding from the outer peripheral surface of the support member, the protrusion engaging an indent on the inner surface of the cutter portion, when the slotting cutter assembly is in the assembled position, and the slotting cutter assembly is further provided with an axial securing arrangement that is distinct and different from the rotational securing arrangement, the axial securing arrangement including at least one securing member that at least partially occupies a bore formed in the support member, when the slotting cutter assembly is in the assembled position, said bore having a longitudinal axis (A) that extends at an angle oblique to a rotary axis (R) of the body portion.

22. The slotting cutter assembly according to claim 21, wherein the axial securing arrangement comprises at least two countersunk through bores extending from a front face of the support member to the outer peripheral surface of the support member that mate, when the body portion is positioned inside the cutter portion, with at least two depressions provided on the inner surface of the cutter portion and countersunk head screws screwed into the at least two countersunk through bores and engaging the at least two depressions.

* * * * *